(12) United States Patent
Nachef

(10) Patent No.: US 7,353,044 B2
(45) Date of Patent: Apr. 1, 2008

(54) METHOD FOR PROCESSING AND TRANSMITTING DATA ON A MOBILE TELEPHONE NETWORK AND MICROCHIP ONBOARD SYSTEM

(75) Inventor: Armand Nachef, Montigny le Bretonneux (FR)

(73) Assignee: CP8 Technologies, Paris (FR)

( * ) Notice: Subject to any disclaimer, the term of this patent is extended or adjusted under 35 U.S.C. 154(b) by 527 days.

(21) Appl. No.: 10/069,181

(22) PCT Filed: Jun. 19, 2001

(86) PCT No.: PCT/FR01/01903

§ 371 (c)(1),
(2), (4) Date: Feb. 22, 2002

(87) PCT Pub. No.: WO01/99448

PCT Pub. Date: Dec. 27, 2001

(65) Prior Publication Data

US 2002/0137545 A1  Sep. 26, 2002

(30) Foreign Application Priority Data

Jun. 22, 2000 (FR) .................................. 00 07978

(51) Int. Cl.
*H04M 1/00* (2006.01)
*H04B 1/38* (2006.01)

(52) U.S. Cl. .................... 455/558; 455/550.1; 455/419

(58) Field of Classification Search ................ 455/558, 455/418, 419, 420, 426.1, 426.2, 557, 550.1, 455/552.1, 556.1
See application file for complete search history.

(56) References Cited

U.S. PATENT DOCUMENTS

| 6,055,424 A | 4/2000 | Anders et al. |
| 6,684,269 B2* | 1/2004 | Wagner ........................ 710/33 |
| 6,859,650 B1* | 2/2005 | Ritter .......................... 455/406 |
| 2002/0042846 A1* | 4/2002 | Bottan et al. ................ 709/249 |

FOREIGN PATENT DOCUMENTS

WO   WO 99 63767   12/1999

* cited by examiner

*Primary Examiner*—George Eng
*Assistant Examiner*—Sam Bhattacharya
(74) *Attorney, Agent, or Firm*—Miles & Stockbridge P.C.; Edward J. Kondracki

(57) ABSTRACT

The invention relates to a method for processing and transmitting digital data in a mobile telephone network, particularly using the GSM standard, and more particularly for applications using the so-called SIM Toolkit standard stores in a smart card of the so-called SIM Type of a unit of mobile equipment (1). According to the method, so-called master applications (30M) are remoted to a remote server (3) with which the mobile equipment (1) communicates. These applications (30M) communicate with the SIM smart card (2) via the circuits of the mobile equipment (10) and first and second types of so-called "reporter" SIM Toolkit applications, respectively called "reporter" (21) and "slave" (22). The invention also concerns an embedded microchip system, particularly a smart card of the so-called SIM type.

13 Claims, 4 Drawing Sheets

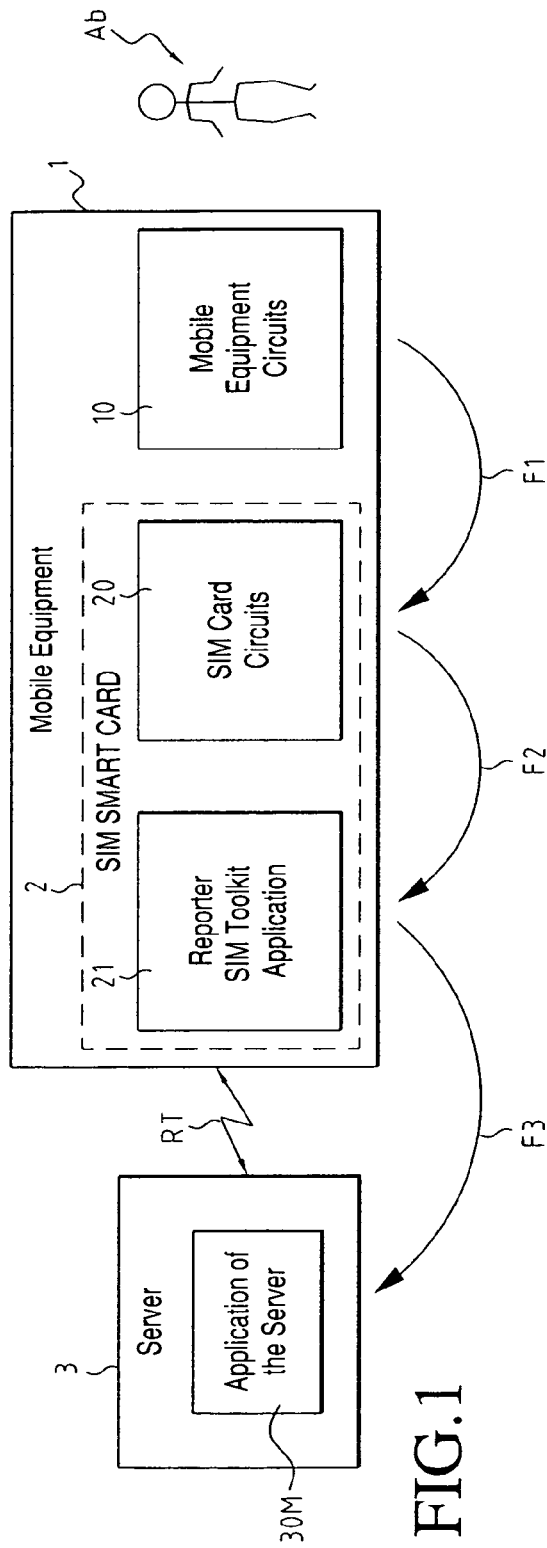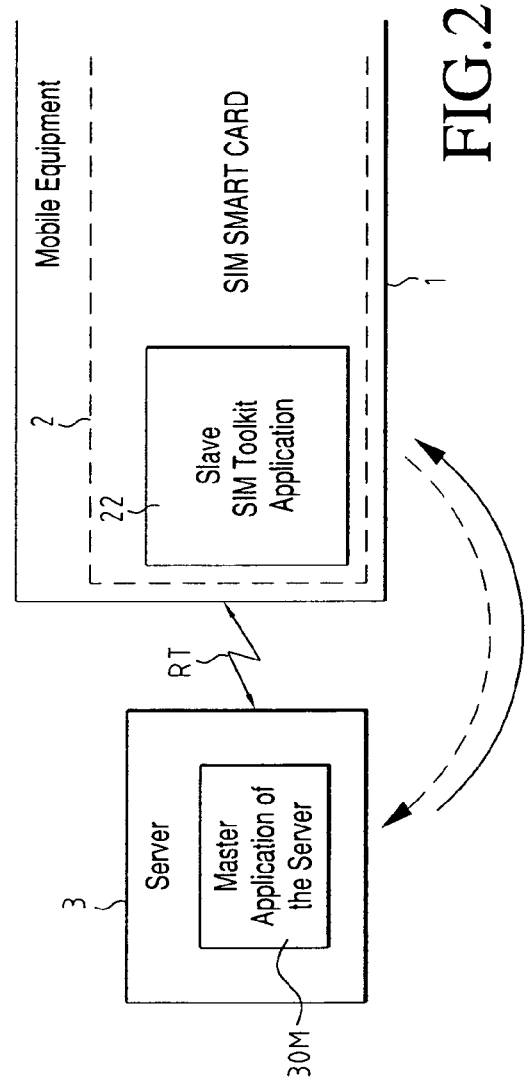

METHOD FOR PROCESSING AND TRANSMITTING DATA ON A MOBILE TELEPHONE NETWORK AND MICROCHIP ONBOARD SYSTEM

BACKGROUND OF THE INVENTION

1. Field of the Invention

The invention relates to a method for processing and transmitting digital data in a mobile telephone network.

It applies more particularly to a mobile telephone network that complies with the "GSM" standard (the acronym for Global System for Mobile Communication, operating in the 900 MHz bandwidth).

The invention also relates to an embedded system equipped with a microchip for implementing the method.

Within the scope of the invention, the term "network" should be understood in its most general sense. It includes the transmission components of the network themselves (radio transmission subsystems, transmission cables, microwave radio systems, terrestrial "wired" subsystems, etc.), but also all the systems connected to the mobile telephone network (base stations, station controllers, switching systems, directories, etc., and more generally, all data processing systems and servers connected to the network), including the mobile telephones, equipment or stations in the possession the users (subscribers) of the mobile telephone network.

The latter devices can be portable telephones or more complex terminals, for example a terminal that combines the telephone and organizer functionalities. For simplicity's sake, without in any way limiting the scope of the invention, these devices will hereinafter be called "mobile telephones." The mobile telephones are specifically equipped with an embedded system equipped with data processing and storage means, including a functional module known by the abbreviation "SIM" (for "Subscriber Identity Module"). Also for simplicity's sake, it will be assumed hereinafter that the "SIM" module is installed in a smart card. Software for operating the smart card is also provided (called "OS," for "Operating System").

2. Description of the Related Art

In the current state of the art, the mobile telephones of GSM networks are no longer used just for telephoning. They can also be used to process and send digital data, particularly in the form of short messages (a service called "GSM-Data"). These messages typically have a length of 160 septets or 140 octets, depending on the applications.

Recently, we have seen the appearance of a standardized technology called "SIM Toolkit." This technology is already included in the complementary services offered by certain mobile telephone operators of GSM networks. In a practical way, a specific piece of software is implemented in the "SIM" smart card of the telephone.

This standard allows the applications running in the smart card ("SIM") of the mobile telephones to send commands to the associated mobile equipment for:

displaying a text on the screen of the mobile telephone;
prompting the user to type the text as input in the application;
requesting a telephone call to a number;
requesting the sending of a short message that contains text or data to a server or to another telephone;
requesting the execution of a command in an auxiliary smart card in the mobile equipment;
etc.

These commands are called "proactive" commands.

The "SIM Toolkit" standard also allows the applications of the "SIM" smart card to react upon reception of a certain number of events issuing from the mobile equipment. These events include:

the selection of the application from a so-called "MENU" command located on a keyboard with which the mobile equipment is equipped;
the reception of a short message sent to an application or to the operating system of the "SIM" smart card;
the expiration of the time programmed into a timer of the mobile equipment;
a request to call a telephone number;
etc.

The functionalities provided by this standard make it possible to develop a very large number of distinct applications in the smart card, in order to provide users with so-called "value-added" services.

For a more detailed description of "SIM Toolkit" technology, it would be useful to refer to the GSM 11.14 standard.

In summary, in the current state of the art, the "SIM Toolkit" standard consists of developing applications in the smart card that are capable both of controlling the mobile equipment supporting the smart card and of reacting to events issuing from his equipment. Today, this standard has been adopted by the majority of manufacturers of mobile equipment and smart cards. It is a standard that makes it possible to write applications that are both powerful and secure.

"SIM Toolkit" application generally communicates with one or more applications installed in servers, via the short message channel. This channel is independent from the voice channel and is standardized by the GSM standard. The applications, whether they are in stalled in the SIM card or in the server, can both send and receive short messages that contain text or data in binary format. (For more information on short messages in point-to-point mode, see the GSM 03.40 standard.)

However, while the number and nature of the aforementioned value-added GSM services are a priori unlimited, telephone operators and developers of software applications are constantly held back by the limited resources available in the smart card.

In essence, the two main drawbacks of the "SIM Toolkit" technology are;

1) insufficient memory for hosting "SIM Toolkit" applications in the smart cards, since the latter include only several tens of kilobytes in memory; in spite of all the optimizations performed by highly experienced developers of software applications, telephone service operators run up against this lack of memory for loading and/or running large numbers of "SIM Toolkit" applications; and 2) the long response time of smart cards; in essence, this technology requires the smart card, which is equipped with minimal computing power compared to the processors of mobile equipment, especially servers, to perform the most complicated calculations during the execution of the aforementioned applications.

It is clear that the needs that have arisen run in the opposite direction. First of all, telephone operators want to offer their subscribers the largest possible number of available additional services. Moreover, the operations performed by the smart card must be done in a minimal amount of time. The increase in available applications, to the extent that this increase is possible, also runs the risk of degrading performance by making the processing time even longer, due to mutual interactions.

Despite the substantial advances in smart card technology already seen lately and foreseeable in the near future, the aforementioned limiting factors remain and will remain an important obstacle.

A second standardized technology called "WAP" (for "Wireless Application Protocol") has recently been proposed. The purpose of this standard is to allow users of mobile telephones to access the Internet from their mobile telephones, via a wireless link.

This technology is not without its drawbacks.

First of all, it is necessary to install a "WAP" browser of a specific type, since it has characteristics different from conventional Web browsers. This browser is installed in the mobile equipment, which definitely has more memory than the smart card, but generally less than a microcomputer and naturally less than a server. Furthermore, although this technology offers the advantage of allowing access to the Internet, it does not cover all the functionalities of SIM Toolkit applications. To give a nonlimiting example, a WAP application cannot, as in the case of SIM Toolkit applications, order telephone calls. Moreover, a WAP application cannot guarantee the same degree of security as that offered by SIM Toolkit applications. In essence, the latter use secret keys stored in the SIM smart cards. For example, a WAP application cannot request the authentication of an application in any server. Moreover, this is not the only security function devolved to the SIM smart card. It also ensures the security and confidentiality of the transmitted information.

In order to provide all of these functions, the smart card stores a certain number of so-called "sensitive" data, encryption algorithms and associated keys, including:

the international subscriber number of "IMSI" (for "International Mobile Subscriber Identity");

the temporary identity assigned to a mobile station when it moves or "TMSI" (for "Temporary Mobile Subscriber Identity");

an individual authentication key, an encryption key used to encrypt and decrypt so-called signaling and traffic data on the radio channel and three distinct encryption and decryption or key generating algorithms; and a number of encryption key sequences or "CKSN" (for "Ciphering Key Sequential Number") indicating the above valid encryption value, in order to avoid the use of different keys by the mobile station and the network.

The fact that this sensitive information or data is stored in the smart card and that the corresponding operations are performed in the latter makes it possible to obtain a high degree of security and confidentiality.

Finally, in the current state of the art, the cost of the mobile equipment that supports WAP technology is still high compared to the cost of the equipment that supports SIM Toolkit technology.

SUMMARY OF THE INVENTION

The object of the invention is to eliminate the drawbacks of the devices and systems of the prior art, some of which have been summarized, while meeting the needs that continue to arise.

The object of the invention is a method for processing and transmitting digital data in a mobile telephone network, particularly using the GSM standard, that makes it possible to offer the users of mobile telephones in this network all of the services that can be offered with applications compliant with SIM Toolkit technology, while eliminating the limitations on memory and performance encountered in the development of applications in smart cards, at least most of them.

To do this, the invention advantageously uses the fact that applications compliant with SIM Toolkit technology can specifically send short messages and can also handle the execution of instructions upon reception of other short messages that are sent to them.

The mobile telephone network architecture according to the invention is an architecture in which SIM Toolkit applications:

1) inform applications installed in at least one remote server connected to said telephone network of the arrival of events issuing from a unit of mobile equipment; these applications will hereinafter be called "SIM Toolkit reporter applications"; and 2) execute commands and instructions in response to the request for applications implemented in said servers; these applications will hereinafter be called "SIM Toolkit slave applications.

This way, it is possible to delegate the execution of intensive operations that use a lot of computer resources, which in the prior art is performed in the SIM smart card, to applications implemented in these servers.

The aforementioned servers do not a priori have any intrinsic limitations as do the SIM smart cards, either in terms of the quantity of available memory or in terms of computing power. The number of SIM Toolkit applications available via a SIM smart card (and hence the number of services offered) can therefore be greatly increased, while allowing a high processing speed.

Furthermore, since the functionalities linked to security and confidentiality remain confined in the SIM smart card, as in the prior art, a high level of quality of service continues to be guaranteed.

Hence, the main subject of the invention is a method for transmitting and processing digital data in a mobile telephone network, said network comprising at least one unit of mobile equipment and a remote server comprising information processing and data storage means, communicating with one another via said mobile telephone network, said mobile equipment cooperating with an embedded microchip system comprising information processing and data storage means designed to store at least some pieces of software capable both of controlling said mobile equipment by sending given commands and of reacting to events issuing from this equipment by executing instructions associated with said events, in order to perform functionalities associated with at least one predetermined application, characterized in that it includes the implementation of at least a first particular piece of software of a so-called reporter type, stored in said data storage means of said embedded microchip system, and the implementation of a least one associated piece of software stored in said data storage means of one of said remote servers, in that said piece of software of the reporter type retransmits to said associated piece of software data characteristic of said events received from said mobile equipment and in that said associated piece of software executes, using said information processing means of said remote server, upon reception of said characteristic data, all or some of said instructions associated with one of said predetermined applications and retransmits results of said execution to said mobile equipment and/or to said embedded microchip system.

Another subject of the invention is an embedded system equipped with a microchip cooperating with a unit of mobile equipment connected to said mobile telephone network.

BRIEF DESCRIPTION OF THE DRAWINGS

The invention will now be described in greater detail by referring to the attached drawings, in which:

FIG. 1 is a diagram that schematically illustrates the main steps of the activation of a SIM Toolkit application located in a remote server by an application, according to one aspect of the invention, of a first so-called "reporter" type, located in a SIM smart card;

FIG. 2 is a diagram that schematically illustrates the interrelation according to the invention between an application located in a remote server, of a so-called "master" type, and a SIM Toolkit application located in a SIM smart card, of a second so-called "slave" type, according to another aspect of the invention;

Figure 3:
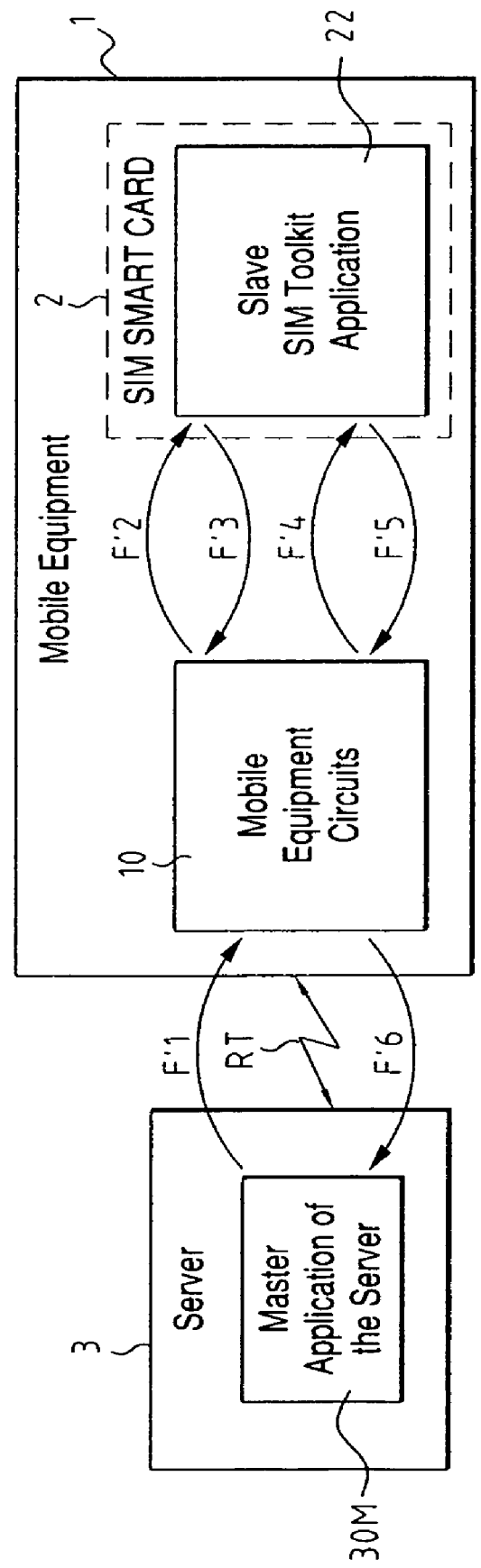
FIG. 3 is a diagram illustrating the main steps of the method according to the invention for sending a proactive command according to the GSM 11.14 standard.

We will now describe in greater detail a preferred exemplary embodiment of a mobile telephone network architecture according to the invention.

DESCRIPTION OF THE PREFERRED EMBODIMENTS

As indicated above, according to one of the characteristics of the invention, the execution of intensive operations, which in the prior art is performed in the SIM card, is delegated to applications implemented in one or more remote servers connected to the network.

According to another characteristic of the invention, two main categories of SIM Toolkit applications are provided, which will be called "Reporter SIM Toolkit Applications" and "Slave SIM Toolkit Applications," respectively, both implemented in the SIM smart cards.

We will now describe both types of applications in greater detail.

Reporter SIM Toolkit Application

First of all, a SIM Toolkit application reacts to events coming from the mobile telephone, or more generally from the subscriber's mobile equipment. These events arrive in the SIM smart card in a command known as an "Envelope." The "Envelope" command can contain, for example, the "Menu Selection" event, with the selection subscript being that of this SIM Toolkit application. This event therefore makes it possible to choose an application from a menu that is displayed on display means with which the mobile telephone is equipped. A more detailed description of this command can be found in the GSM 11.14 standard.

The mobile equipment has no knowledge of the applications found in the servers. In order to make an application in a server react to events defined in the SIM Toolkit standard, it is necessary to couple it with a SIM Toolkit application installed in the SIM card, which will hereinafter be called the "Reporter SIM Toolkit application." The mobile equipment sees the reporter application as though it were a conventional SIM Toolkit application. It has no knowledge of the corresponding application located in a server. From this point of view, there is total transparency.

The reporter application is written into the SIM Card in order to listen for events to which its corresponding application implemented in a server must react. As soon as the reporter application receives an event coming from the mobile equipment, it prepares a short message to be sent to its corresponding application. This short message contains all of the data that characterizes the event received. It is sent in a practical way by a command of the aforementioned "proactive command" type.

The corresponding application of the server receives the short message. This message informs it of the occurrence of an event coming from the mobile equipment. It then performs the operation related to the reception of this event. This operation can consist, for example, of connecting to a web site. It can also become a so-called master application of another so-called slave application implemented in the SIM smart card. It can consequently control the slave application so that it sends proactive commands to the mobile equipment and so that it also invokes methods stored in libraries installed in the SIM smart card.

FIG. 1 is a diagram that schematically illustrates the main steps in the activation of a SIM Toolkit application 30M located in a remote server 3 by an application of the "Reporter SIM Toolkit" 21 located in a SIM smart card 2 of a unit of mobile equipment 1. The remote server 3 and the mobile equipment 1 of the subscriber Ab are both connected to a mobile telephone network RT (not explicitly represented). This network, which is well known to one skilled in the art and intrinsically conventional, does not require any modification due to the method of the invention. It follows that, a priori, any network according to the prior art is usable, which represents an additional advantage of the invention. It is not necessary to further describe such a network and its various components. It may be useful, as a non-limiting example, to refer to the article by Jean Cellmer entitled "Réseaux Cellulaires, Système GSM" appearing in "Techniques de l'Ingénieur," Volume TE 7364, November 1999, pages 1 through 23.

The mobile equipment 1, for example a portable telephone, includes the conventional electronic circuits (memories, processor, etc.) 10. The latter can be coupled with a SIM smart card 2 by means of a reader (not represented). The SIM smart card 2 also includes electronic circuits 20, particularly a processor and storage means in which SIM Toolkit applications can be stored, which will be referred to as conventional (not represented) since they are intrinsically common to the prior art, as well as one or more reporter SIM Toolkit applications 21 according to one of the characteristics of the invention. In FIG. 1, in order to illustrate the process simply, only one application is represented, shown outside the circuits 20 of the SIM smart card 2. In reality, this application 21 is stored, like the conventional applications, in the storage means of the smart card 2.

The aforementioned steps are the following (symbolized by solid arrows in FIG. 1):

F1) the circuits 10 of the mobile equipment 1 sent a command of the "Envelope" type to the circuits 20 of the SIM smart card 2: this "Envelope" command contains one of the events provided in the aforementioned GSM 11.14 standard;

F2) the circuits 20 of the SIM card 2 send this event to a reporter SIM Toolkit application 21 capable of responding to it; and F3) the reporter SIM Toolkit application 21 sends this same event, in a short message, to a corresponding application 30M located in the server 3 that will process it, via the network RT.

For reasons that will be explained below, the application 30M will be called the "master application."

Slave SIM Toolkit Application

In an intrinsically known way, a SIM Toolkit application of the prior art can specifically:

a) send proactive commands in accordance with the GSM 11.14 standard to the mobile equipment; it can, for example, ask the mobile equipment to display text;

b) send commands in accordance with the aforementioned GSM 11.11 standard to the operating system of the SIM smart card, without passing through the mobile equipment; and c) request the execution of methods stored in libraries implemented in the SIM smart card; it can for example call a method of the SIM smart card in order to request the encryption of a message by means of a secret key stored in this card.

According to an additional aspect of the invention, the applications implemented in the remote servers are equipped with these functionalities. It is thus possible to delegate to them the operation that, in the prior art, is performed using a conventional SIM Toolkit application implemented in the smart card.

In order for an application implemented in a remote server 3 to be able to perform these operations, it is necessary for it to be able to communicate with a SIM Toolkit application implemented in the SIM smart card 2. It then sends commands to the latter application, which executes them. Hereinafter, the applications implemented in the remote servers will be called "master applications" and the SIM Toolkit applications installed in the SIM smart card will be called "slave SIM Toolkit applications."

FIG. 2 is a diagram that schematically illustrates the interrelation between these two types of applications.

A "Master" application 30M sends a command (solid line in FIG. 2) to a slave SIM Toolkit application 22. The latter application executes the command, then responds to the "Master" application 30M by returning the result of the command (broken line) to it after processing.

We will now describe in detail how a "Master" application 30M can send commands of the aforementioned types a) through c).

Sending a Proactive Command in Accordance with the GSM 11.14 Standard

The main steps of the method according to the invention are explained below, in reference to the diagram of FIG. 3:

a) a master application 30M prepares a proactive command to be executed by the circuits 10 of a unit of mobile equipment 1; it includes it in the data of a short message sent to a slave SIM Toolkit application 22 (via the circuits 10 of a unit of mobile equipment 1, in which the proactive command is executed)—the arrows F'1 and F'2 in FIG. 3;

b) the slave SIM Toolkit application 22 analyzes the data of the short message received; it understands that the master application 30M is asking it to send the proactive command to the circuits 10 of its mobile equipment 1; it therefore transfers this command to the mobile equipment 1 and puts itself on standby for a return response—the arrow F'3;

c) the circuits 10 of the mobile equipment 1 receive the proactive command; they execute it and send a response to the SIM card 2 in the form of a command commonly called a "Terminal Response—the arrow F'4—which command contains the result of the execution of the proactive command by the circuits 10 of the mobile equipment 1 (for example, if the proactive command consists of asking to power up an auxiliary smart card, not represented, in the mobile equipment 1, the result sent in the "Terminal Response" command contains a byte string that is the response of a reset of the auxiliary card);

d) the slave SIM Toolkit application 22, which has been on hold since the sending of the proactive command, is released upon reception of the aforementioned "Terminal Response" command;

e) the slave SIM Toolkit application 22 prepares a short message containing the result of the proactive command it found in the "Terminal Response" command issued by the circuits 10 of the mobile equipment 1;

f) the slave SIM Toolkit application 22 sends this short message, in a proactive command, to the master application 30M, via the circuits 10 of the mobile equipment 1—the arrow F'5;

g) the circuits 10 of the mobile equipment 1 transfer the short message to the master application 30M—the arrow F'6; and h) the master application 30M receives it and processes the response from the proactive command it sent previously.

Sending a "Non-proactive" Command, i.e., in Accordance with the GSM 11.11 Standard The master application 30M (FIG. 3) can send GSM 11.11 commands to the SIM smart card 2 using two different methods, either of which two methods can be used.

Method 1 a) a master application 30M prepares a command in accordance with the GSM 11.11 standard, to be sent to a slave SIM Toolkit application 22 implemented in the SIM smart card 2; it sends it in a short message, via the circuits 10 of the mobile equipment 1;

b) the slave SIM Toolkit application 22 analyzes the data of the short message received; it transmits the command found in this message to the operating system 23 of the SIM smart card 2;

c) the operating system 23 of the SIM smart card 2 executes the command that comes from the slave SIM Toolkit application 22 and returns a response to this command to this application 22;

d) the slave SIM Toolkit application 22 prepares a short message having as its destination a corresponding master application 30M implemented in the remote server 3; this message contains the result of the GSM 11.11 command and is sent by the slave application to the circuits 10 of the mobile equipment 1, in a proactive command;

e) the circuits 10 of the mobile equipment 1 transfer the short message to the address of the recipient indicated in the message itself, i.e., the master application 30M; and f) the master application 30M receives it and processes the response received.

Method 2

The master application 30, implemented in the remote server 3, sends a GSM 11.11 command in a short message directly to the operating system 23 of the SIM smart card, in accordance with the GSM 03.40 and GSM 03.48 standards.

The advantage of this solution is its simplicity, since it does not require the presence of a slave SIM Toolkit application, as in the case of Method 1.

On the other hand, the drawback of Method 2 is that very few SIM Smart card operating systems fully implement this functionality. In general, an application of a server can send a command script in a short message in order to be executed, but the SIM smart card does not return the result of the command. If, for example, the application implemented in the server needs to know the contents of a file in the SIM smart card, it cannot do so in the majority of SIM smart cards.

Calling a Function of a Library of the SIM Smart Card

As indicated above, a SIM Toolkit application may need to request the execution of a function included in a library of the SIM smart card (the aforementioned operation c)). There are two main categories of functions in a SIM smart card.

1) the functions that use in their parameters at least one secret key stored in the smart card; these functions are used to encrypt, decrypt, sign or verify a signature; and 2) the functions that, on the contrary, do not use secret keys.

Functions in the first category cannot be remoted to a server if it is necessary to maintain a high degree of security, as mentioned above. A slave application 23 (FIG. 3) must be capable of calling them following a request from the master application 30M.

A convention must exist between the slave application 22 and the master application 30M in order to allow the latter to perform encryption/decryption and signature operations with secret keys of the SIM smart card 2.

For example, the master application 30M sends a message to the slave application 22 in which it indicates the nature of the cryptological function to be performed (for example an encryption using the algorithm known as "DES," for "Data Encryption System"). It also indicates the references of the key to be used, stored in the SIM smart card, and the message to be encrypted. The slave application 22 calls the appropriate encryption function and returns the result to the master application 30M.

For the second category of functions, it is possible to use the same method as that used for the first category, but according to an advantageous characteristic of the invention, these functions are implemented directly in a remote server 3. The advantage of this solution is that the processing is done without the need for a connection to a machine that is a priori much more powerful than the SIM smart card 2.

According to one of the characteristics of the invention, part of the SIM Toolkit applications is implemented directly in one or more remote servers 3. To guarantee easy migration of these SIM Toolkit applications from the SIM smart cards, it is also necessary to implement all the associated functions that are located in the libraries of the SIM smart card.

To illustrate the concepts, if we consider so-called "Java" (registered trademark) cards, these functions are constituted by "Javacard APIs," GSM 03.19 APIs, and so-called "proprietary," i.e. specific APIs. "Java" is an object-oriented programming language developed by Sun Microsystems, Inc., and APIs are programmable interfaces with applications. The Java language specifically makes it possible to develop short applications known as "applets." The SIM Toolkit applications can be created based on applets.

Using these provisions specific to the invention, it is possible to ensure that an application in existing SIM Toolkit technology, which in the prior art is executed in a SIM smart card, can also be executed in a remote server, without its being necessary to modify a line of code, which constitutes an additional advantage of the invention.

It has been assumed up to this point that the so-called short message technology (i.e., in accordance with the GSM 03.40 standard) is used as the transport technology. The use of this technology is advantageous because:

1) it is widely use in GSM networks today; and 2) it is available in the events and the proactive commands of the SIM Toolkit standard (i.e., in accordance with the GSM 11.14 standard).

However, it should be clear that it is also possible to use other technologies for transport through wireless transmission links that exist between a SIM smart card and a remote server, whether these technologies are available currently or will be in the future.

The mechanisms of the slave and reporter SIM Toolkit applications defined above do not require any modifications, which gives the method according to the invention great perenniality.

In the mechanism of the slave and master SIM Toolkit applications, the slave SIM Toolkit application has been assumed to be a complete slave. It is also possible, while remaining within the scope of the invention, to consider slave SIM Toolkit applications that have a certain "intelligence." This type of application, which will be called a "hybrid" is capable both of obeying a master application and of performing local operations autonomously. In essence, a SIM Toolkit application, although it is a slave, continues to have the capabilities inherent in conventional SIM Toolkit applications.

Likewise, it is possible to add a functionality of a similar type, i.e. a certain "intelligence," to the reporter applications.

One is led to conclude that remoting applicative functionalities from a SIM Smart card to a remote server increases the traffic in the network and may, under certain unfavorable conditions, have non-negligible consequences on the response time, since the transfer rate of the short message protocol is low.

Also, in practice, the SIM Toolkit applications most often preferred are both slave and autonomous, and/or are both reporter and autonomous, which makes it possible to minimize the negative impact of the aforementioned increase in traffic.

In an equally practical way, a compromise is sought between the use of the resources of the SIM smart card and the sending of short messages, which can be detrimental in terms of performance.

It should also be noted that authentications between the SIM Toolkit applications implemented in the SIM smart card, whether they be slave or reporter, and the applications implemented directly in a server must take place. They can be performed in compliance with the GSM 03.48 standard.

This standard also provides for the encryption of certain information that is transported during exchanges between a SIM smart card and a remote server.

In general, a master application must communicate with several slave applications. To do this, it is advantageous to use the so-called "Threads" technique during the implementation of the APIs in the servers.

In the current state of the art, SIM smart cards of the aforementioned Java type, which implement the GSM 03.19 standard, do not know how to send a command to the mobile equipment without passing through an object class known by the name "sim.toolkit.ProactiveHandler". When a slave SIM Toolkit application receives a proactive command sent by a master application, it must reconstruct it using methods of an object class known by the name "ProactiveHandler". It is clear that it is therefore necessary to redo all the work prepared by the server that sent the command, before sending a proactive command to the mobile equipment.

In order for the mechanism of the slave and master applications to retain all of its advantages according to one of the characteristics of the invention, a function is advantageously implemented in the SIM smart card which does nothing more than send the mobile equipment a proactive command from any byte array. The slave SIM Toolkit application can then accept the proactive command received, which command was prepared and sent by the master application. It then sends it to the mobile equipment without performing any additional operation.

Practical Exemplary Embodiment

Figure 4:
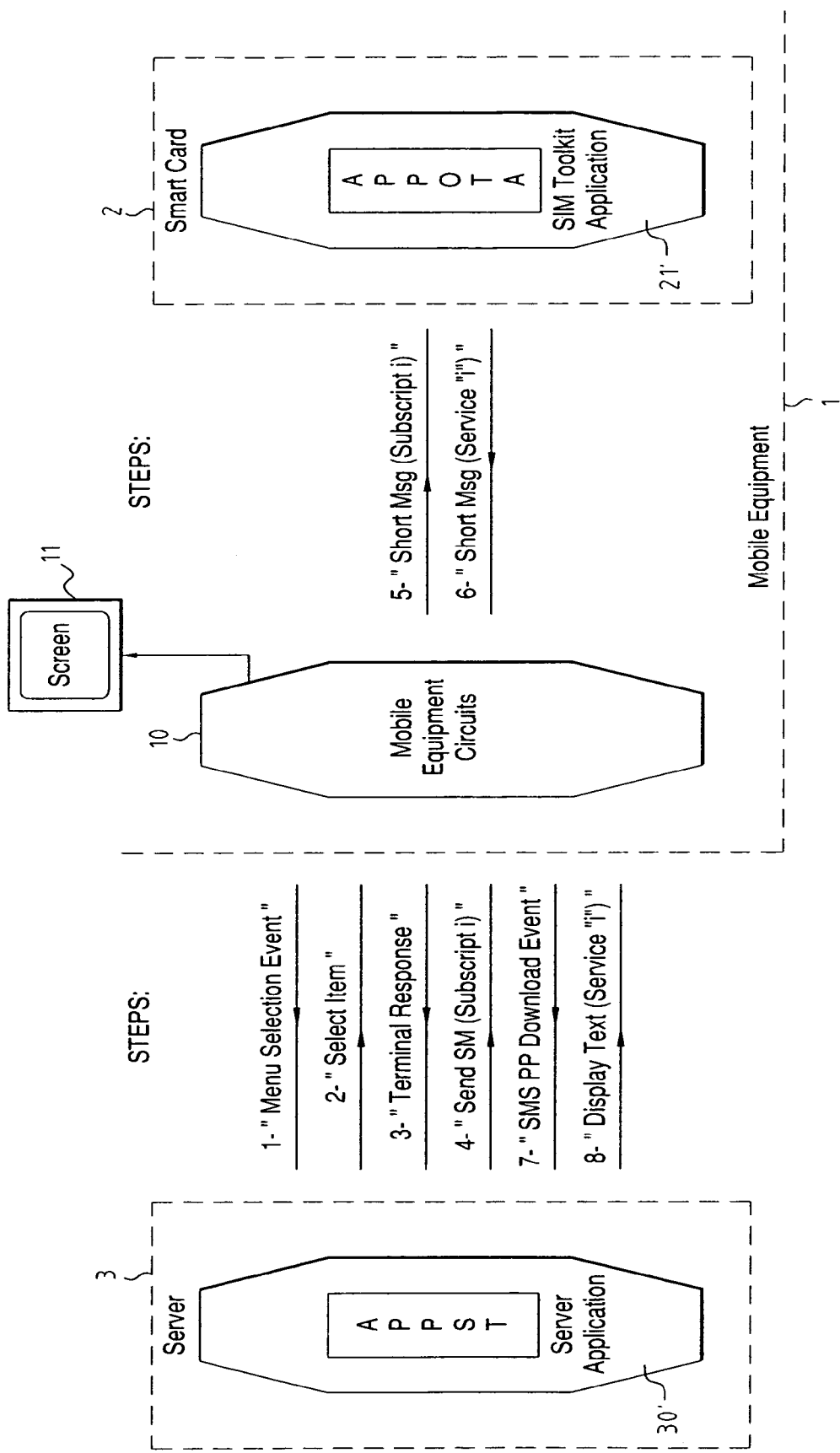
FIG. 4 is a diagram illustrating, for one particular example, the main steps for exchanging data and commands between a SIM Toolkit application located in a SIM smart card and an application located in a remote server, according to the prior art.
Figure 5:
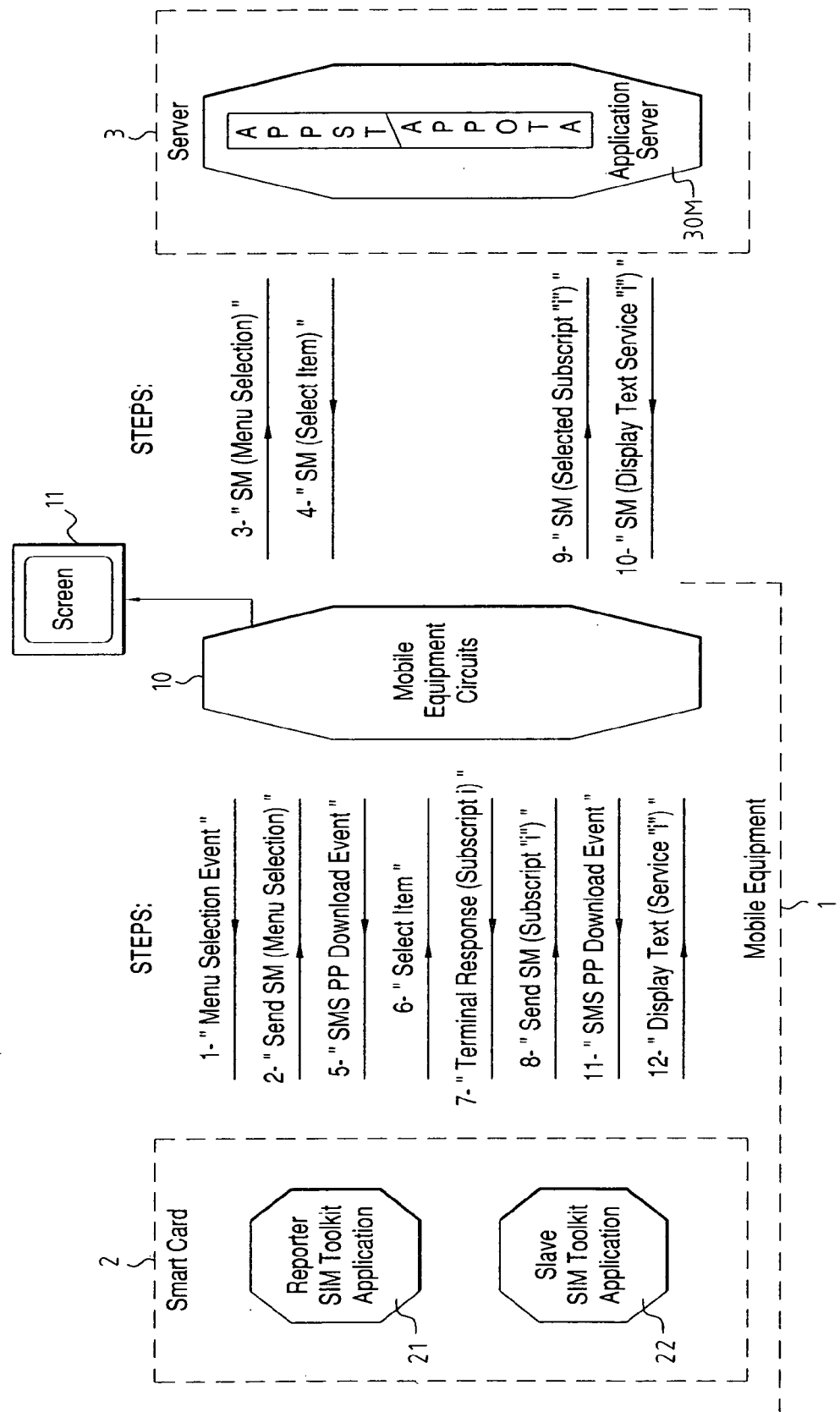
FIG. 5 is a diagram illustrating, for this particular example, the main steps for exchanging data and commands between a SIM Toolkit application located in a SIM smart card and an application located in a remote server, according to the method of the invention.

We will now describe in greater detail a practical exemplary embodiment in reference to FIGS. 4 and 5.

It is assumed that it is necessary to access n services implemented in a short message server. Hereinafter, these services will arbitrarily be called Service 1, Service 2, . . . , Service n. It is assumed that the SIM Toolkit applications are created based on Java applets.

The development of such an application with conventional SIM Toolkit technology, i.e. according to the prior art, requires the development of:

1) a SIM Toolkit application that may be called "AppST", implemented in a SIM smart card; and
2) another application that may be called "AppOTA", implemented in a remote server that will be called "OTA" (for "Over the Air").

The application "AppST" responds to two events, which are: "Menu Selection" and "SMS PP Download".

When the application "AppST" receives the event "Menu Selection", it sends the mobile equipment a proactive command called "Select Item", i.e. the selection of an item from the menu (a service) among the n services proposed.

The user chooses, for example, the service with the rank or arbitrary subscript i, or Service i. An applet of the application "AppST" sends, in a proactive command, a short message to the application "AppOTA", indicating to it that the user is requesting the service Service i.

The application "AppOTA" receives the short message coming from the application "AppST" and responds to it by returning it the content of Service i in another short message.

When the application "AppST" receives the short message coming from the application "AppOTA", it sends a proactive command of the type called "Display Text" in order to display its content on the screen of the mobile equipment.

FIG. 4 is a diagram that schematically illustrates the preceding eight steps according to the prior art:

Step 1: the sending by the circuits 10 of the mobile equipment 1 of "Menu Selection Event" to the application "AppST" 30';

Step 2: the sending by the application "AppST" 30' of "Select Item" to the circuits 10 of the mobile equipment 1;

Step 3: the response from these circuits by sending "Terminal response" to the application "AppST" 30';

Step 4: the sending by the latter of "Send SM (subscript i)" (send short message with subscript i) to the application "AppST" 30';

Step 5: the sending by the latter of "Short Msg (subscript i)" (sending of the short message with subscript i) to the application "AppOTA" 21';

Step 6: the response from the latter and sending of "Short Msg (Service "i") (short message for the service with subscript "i");

Step 7: the sending by the circuits 10 of the mobile equipment 1 of "SMS PP Download Event" to the application "AppST" 30'; and Step 8: the sending by the application "AppST" 30' of "Display Text (Service "i') " to the circuits 10 of the mobile equipment 1 in order to display the content of the short message associated with the service with the subscript "i" so as to display the content on a screen 11 of the mobile equipment 1.

The development of this same application according to the method of the invention takes place as described below, in reference to FIG. 5

Two SIM Toolkit applications constituted by Java applets are installed in the smart card 2: the first is the reporter application 21, which transmits the events received in short messages to a corresponding application, or master application 30M of the server 3.

The second is the slave application 22, which executes the orders from the master application 30M of the server 3.

It should be noted that the master application 30M of the server 3 plays the role of the both the applications "AppST" and "AppOTA" of the prior art described in reference to FIG. 4.

Once this application 30M receives the event "Menu Selection", it becomes the master of the slave SIM Toolkit application 22.

It first asks it to transmit to the circuits 10 of the mobile equipment 1 the aforementioned proactive command "Select Item". When it receives the response of this command, it again asks it to execute the proactive command "Display Text" in order to display the selected service.

The method according to the invention, for the application described, then includes the twelve steps detailed below:

Step 1: the sending by the circuits 10 of the mobile equipment 1 of "Menu Selection Event" to the reporter application (this step is initiated by the user of the mobile equipment 1);

Step 2: the response and sending by the reporter application 21 of "Send SM (Menu Selection)" (send a short menu selection message) to the circuits 10 of the mobile equipment 1;

Step 3: the sending by the circuits 10 of the mobile equipment 1 of "SM (Menu Selection)" to the application 30M (the "AppST" part of this application);

Step 4: the processing and sending by the application 30M of "SM(Select Item)" to the circuits 10 of the mobile equipment 1;

Step 5: the sending by the latter of "SMS PP Download Event" to the slave application 22;

Step 6: the processing by the slave application 22 and sending of "Select Item" to the circuits 10 of the mobile equipment 1;

Step 7: the sending by the circuits 10 of the mobile equipment 1 of "Terminal Response (subscript i)" to the slave application 22;

Step 8: the sending by the latter of "Send SM (Subscript "i")" to the circuits 10 of the mobile equipment 1;

Step 9: the sending by the circuits 10 of the mobile equipment of "SM (selected subscript "i")" (short message for processing with the selected subscript "i") to the application 30M (the "AppOTA" part);

Step 10: the processing and sending by the application 30M of "SM(Display Text Service "i")" to the circuits 10 of the mobile equipment 1;

Step 11: the sending by the latter of "SMS PP Download Event" to the slave application 22; and Step 12: the processing and sending of "Display text (Service "i") to the circuits 10 of the mobile equipment 1, in order to display the content of the short message.

The implementation of the method according to the invention causes a slight increase in traffic in the network, since the number of steps is greater for the same application. However, the main application associated with a given service has been remoted from the SIM smart card 2 to the server 3. It follows that the number of services is potentially no longer limited, since it is no longer necessary to load so many applets into the SIM smart card 2. The memory resources of the server 3 are in fact incomparably greater than those present in the SIM smart card 2. Likewise, the processing speed is higher, since the processor or processors present in the server 3 are also much more powerful than those that can be installed in the SIM smart card 2.

Furthermore, depending on the precise context in which he is working, a developer of software applications retains the capability to distribute the operations to be performed in an optimized way between the SIM smart card 2 and the server 3, according to an additional advantageous aspect of the invention that has been explained.

To do this, certain SIM Toolkit applications can be left in the SIM smart card 2. These applications work in a way identical, or at least very similar, to the applications of the prior art.

According to another variant of embodiment permitted by the method of the invention, all or part of the slave 22 and/or reporter 21 applications can be of the aforementioned hybrid type, i.e., they can retain a certain autonomy. It follows that, in this case, some of the operations continue to be performed locally, which proportionally reduces the traffic between the SIM smart card 2 and the remoter server(s) 3.

Through the reading of the above, it is easy to see that the invention achieves the stated objects.

In particular, it makes it possible to remote "intensive" operations that use a lot of computer resources, to data processing systems (remote servers) that have no limitations, or at least no substantial limitations, particularly in terms of data storage. Moreover, the operations can be performed at high speed, since the computing means present in these system are also very fast and powerful.

According to another aspect of the invention, although the method according to the invention may entail excess traffic under certain conditions, this drawback can be greatly minimized by optimizing the part of the operations that is remoted and the part of the operations that is still performed locally, i.e. in the SIM smart card or any module functioning as such.

Because of this, the invention makes it possible to offer a virtually unlimited number of services without having to accordingly increase the quantity of data to be stored in the SIM smart card, or at least while increasing it only marginally.

It should also be understood that the aforementioned remoted applications include SIM Toolkit applications per se, but also associated data files. For example, it may be advantageous to remote a user's personal data, which is normally called his "environment," to a remote server: address book, list of telephone numbers, etc. Here again, the size of these files becomes virtually unlimited.

Finally, it may be said that the invention offers the advantage, when an update of one or more application(s) must be performed, if the latter is (are) installed in a remote server, that this update can be performed by the operator in a way that is very simple and fast, since it is centralized. In the case of SIM Toolkit applications that are standard, i.e. according to the prior art, installed in smart cards, the same operation would require the modification of all the smart cards storing the applications to be updated, i.e. most often their replacement.

It should be clear, however, that the invention is not limited to just the exemplary embodiments explicitly described, particularly in connection with FIGS. 1 through 3 and 5.

Moreover, as indicated, it is not limited to just the transmission protocols that use short messages.

Finally, while it advantageously applies to telephone networks using the GSM standard, other standards may be suitable, particularly the standards currently under development: "GPRS", "UTMS", etc. Generally, the invention applies each time a unit of mobile equipment is used with a smart card or any similar embedded system, and when there is a separation between functions installed directly in this embedded system and functions present in the mobile equipment.

It also makes it possible to interface with applications of the WAP type or to perform functions of this type. For example, a master application present in a remote server can directly access the Internet at the request of the mobile equipment, without first passing back through the mobile equipment. The result of the requests made is then sent to the slave application, according to the method specific to the invention.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A method for processing digital data in a mobile telephone network comprising a mobile unit operatively connected to a smart card having an embedded chip, said embedded chip having an information processor and a data storage unit, said data storage unit including a reporter-type application program and a slave-type application program, said method comprising:

receiving, by said reporter-type application program in said smart card, an event sent from said mobile unit;

delegating, in response to receiving said event, execution of a smart-card operation to an additional application program stored in a data storage unit of a remote application server, said additional application program being a master-type application program, wherein said delegating comprises sending a message for processing from the reporter-type application to the master-type application of the remote application server via a channel of said mobile telephone network;

receiving, by said slave-type application program, commands from the master-type application program using said mobile telephone network;

executing said commands using said information processor of said embedded chip of the smart card; and retransmitting results of said executing commands to the master-type application program using said mobile telephone network.

2. A method according to claim 1, wherein the data storage unit of the smart card stores at least one program which controls said mobile unit by sending commands, and which reacts to events sent from said mobile unit, said program executing instructions associated with said events in order to perform functionalities associated with at least one predetermined application.

3. A method according to claim 2, wherein the reporter-type application program retransmits to the remote application server a data characteristic of said event received from said mobile unit, and the additional application program in the remote application server executes, upon reception of said data characteristic, at least one of said instructions associated with said at least one predetermined application and retransmits results of said execution to said embedded chip in the smart card.

4. A method according to claim 2, wherein at least one of the reporter-type application program and the slave-type application program is an autonomous-type application program which directly executes a pre-established part of said at least one predetermined application in said embedded chip of the smart card.

5. A method according to claim 3, wherein said embedded chip is under the control of an operating system, and said remote application server transmits said execution results, including commands to said operating system of said embedded chip, in order to perform a given operation, and results of said given operation are retransmitted to the remote application server.

6. A method according to claim 1, wherein at least one of the reporter-type application program and the slave-type application program is an autonomous-type application program which directly executes a pre-established part of at least one predetermined application in said embedded chip of the smart card.

7. A method according to claim 1, wherein said mobile telephone network complies with a GSM standard, and said reporter-type application program complies with a GSM 11.14 standard.

8. A method according to claim 1, wherein said telephone network includes at least two distinct transmission channels, one of which being a voice data channel and another of which being a message channel, and said transmitted digital data includes messages of a short type comprising 140 octets or 160 septets transmitted through said message channel.

9. A method according to claim 1, wherein the reporter-type application program retransmits to the remote application server a data characteristic of said event received from said mobile unit, and the second application program in the remote application server executes, upon reception of said data characteristic, at least one of said instructions associated with at least one predetermined application and retransmits results of said execution to said embedded chip in the smart card.

10. A smart card adapted for connection to a mobile unit in a mobile telephone network, comprising:

an embedded chip which includes:
(a) an information processor; and
(b) a data storage unit having a reporter-type application program and a slave-type application program stored therein, said reporter-type application program adapted to generate information delegating execution of a smart-card operation to an additional application program stored in a data storage unit of a remote application server, and said reporter-type application program generating said information in response to an event received from said mobile unit;

wherein the additional application program stored in the remote application server is a master-type application program, wherein said delegating comprises sending a message for processing from the reporter-type application to the master-type application of the remote application server via a channel of said mobile telephone network; and said slave-type application program receives commands from the master-type application program of the remote application server using said mobile telephone network, and executes said commands using said information processor, and retransmits results of said execution of commands to the master-type application program of the remote application server using said mobile telephone network.

11. A smart card system according to claim 10, wherein the smart card is a Subscriber Identity Module (SIM)-type card.

12. A smart card according to claim 10, wherein at least one of the reporter-type application program and slave-type application program is an autonomous-type application program which directly executes a predetermined application.

13. A smart card system according to claim 12, wherein the smart card is a Subscriber Identity Module (STM)-type card.

* * * * *

UNITED STATES PATENT AND TRADEMARK OFFICE
CERTIFICATE OF CORRECTION

PATENT NO. : 7,353,044 B2  Page 1 of 1
APPLICATION NO. : 10/069181
DATED : April 1, 2008
INVENTOR(S) : Armand Nachef It is certified that error appears in the above-identified patent and that said Letters Patent is hereby corrected as shown below:

Title Page, Col. 2 (56) References Cited – Foreign Patent Documents

Please add the following:

WO 98 31172 07/1998
WO 99 28884 06/1999
WO 98 33343 07/1998

Column 16, Line 44, replace "STM" with "SIM".

Signed and Sealed this

Thirtieth Day of June, 2009

JOHN DOLL
*Acting Director of the United States Patent and Trademark Office*